(12) United States Patent
Heuler et al.

(10) Patent No.: US 9,140,348 B2
(45) Date of Patent: Sep. 22, 2015

(54) HYDRODYNAMIC COUPLING ARRANGEMENT, IN PARTICULAR A TORQUE CONVERTER

(75) Inventors: Michael Heuler, Wuerzburg (DE);
Patrick Rediger, Schweinfurt (DE);
Mario Kensy, Hammelburg (DE);
Alexander Strom, Bad Kissingen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 819 days.

(21) Appl. No.: 13/139,212

(22) PCT Filed: Dec. 7, 2009

(86) PCT No.: PCT/EP2009/066487
§ 371 (c)(1),
(2), (4) Date: Jun. 10, 2011

(87) PCT Pub. No.: WO2010/066665
PCT Pub. Date: Jun. 17, 2010

(65) Prior Publication Data
US 2011/0240429 A1    Oct. 6, 2011

(30) Foreign Application Priority Data

Dec. 10, 2008  (DE) .................... 10 2008 054 461
Apr. 20, 2009  (DE) .................... 10 2009 002 481

(51) Int. Cl.
*F16F 15/139*  (2006.01)
*F16H 45/02*  (2006.01)
(Continued)

(52) U.S. Cl.
CPC .............. *F16H 45/02* (2013.01); *F16F 15/145* (2013.01); *F16H 2045/0226* (2013.01); *F16H 2045/0231* (2013.01); *F16H 2045/0247* (2013.01); *F16H2045/0263* (2013.01); *F16H 2045/0278* (2013.01)

(58) Field of Classification Search
USPC .............. 192/3.28, 30 V, 213.2; 60/338, 366; 74/574.2
See application file for complete search history.

(56) References Cited

U.S. PATENT DOCUMENTS

| 6,026,940 A | | 2/2000 | Sudau |
| 6,059,082 A | * | 5/2000 | Fitzpatrick-Ellis et al. . 192/3.29 |
| 6,066,047 A | * | 5/2000 | Orlamunder et al. ........ 464/68.5 |

(Continued)

FOREIGN PATENT DOCUMENTS

| DE | 19804227 | 8/1999 |
| DE | 10013652 | 9/2001 |

(Continued)

*Primary Examiner* — Robert Hodge
*Assistant Examiner* — Stacey Fluhart
(74) *Attorney, Agent, or Firm* — Cozen O'Connor

(57) ABSTRACT

A hydrodynamic coupling includes a housing coupled to a driveshaft having an impeller and a turbine wheel arranged in the housing driven by the impeller and a first damper arrangement by which the housing is coupled to a driven member by a lockup clutch. The first damper arrangement includes a first torsional vibration damper connected to the lockup clutch that is rotatable around an axis of rotation against the action of a first damper spring arrangement. A second torsional vibration damper is connected to the first torsional vibration damper and rotatable around the axis of rotation against the action of a second damper spring arrangement. The turbine wheel is connected to an intermediate torsional vibration damper region including a first secondary side, a second primary side, a second damper arrangement has a deflection mass carrier connected to the second secondary side.

8 Claims, 10 Drawing Sheets

(51) Int. Cl.
*F16F 15/123* (2006.01)
*F16F 15/14* (2006.01)

(56) References Cited

U.S. PATENT DOCUMENTS

2008/0236975 A1  10/2008  Frey et al.
2009/0283375 A1*  11/2009  Degler et al. ............... 192/3.28
2011/0031083 A1*  2/2011  Matsuoka et al. ........... 192/3.29
2011/0179782 A1*  7/2011  Huegel et al. .................. 60/338

FOREIGN PATENT DOCUMENTS

| DE | 102004004176 | 8/2005 |
| DE | 102006028556 | 1/2007 |
| DE | 102007014311 | 10/2008 |

* cited by examiner

HYDRODYNAMIC COUPLING ARRANGEMENT, IN PARTICULAR A TORQUE CONVERTER

PRIORITY CLAIM

This is a U.S. national stage of Application No. PCT/EP2009/066487, filed on Dec. 7, 2009, which claims priority to German Application No: 10 2008 054 461.2, filed: Dec. 10, 2008, and German Application No. 10 2009 002 481.6, filed Apr. 20, 2009, the contents of which are incorporated herein by reference.

BACKGROUND OF THE INVENTION

1. Field of the Invention

The present invention is directed to a hydrodynamic coupling arrangement, in particular a torque converter, comprising a housing be coupled to a driveshaft having an impeller, a turbine wheel arranged in an interior space of the housing driven by the impeller, and a first damper arrangement by which the housing can be coupled to a driven member by a lockup clutch. The first damper arrangement comprises a first torsional vibration damper having a first primary side connected to the lockup clutch and a first secondary side which is rotatable with respect to the first primary side around an axis of rotation against the action of a first damper spring arrangement, and comprising a second torsional vibration damper having a second primary side connected to the first secondary side of the first torsional vibration damper and a second secondary side rotatable with respect to the second primary side around the axis of rotation against the action of a second damper spring arrangement. The turbine wheel is connected to an intermediate torsional vibration damper region comprising the first secondary side and the second primary side.

2. Related Art

A hydrodynamic coupling arrangement of the kind mentioned above is used as component of the powertrain of a motor vehicle and is employed therein for coupling the engine to the transmission. When the lockup clutch is open, torque can be transmitted along a first torque transmission path from the engine via the impeller, the turbine wheel and the second torsional vibration damper to the driven member and from there to the transmission. A second torque transmission path along the closed lockup clutch and the first and second torsional vibration dampers serves to bypass the first torque transmission path so as to prevent friction losses in the hydrodynamic circuit generated by the impeller.

Rotational irregularities occurring in operation can excite vibrations in the powertrain which in turn result, for example, in the occurrence of rattling noises in the passenger compartment of the motor vehicle. Therefore, the effort is made to counteract the excitation of vibrations of this kind by providing dampers. For this purpose, the first torsional vibration damper and second torsional vibration damper are provided in the second torque transmission path between the lockup clutch and the driven member. The turbine wheel is coupled to the intermediate torsional vibration damper region so as to be fixed with respect to rotation relative to it so that the second torsional vibration damper also acts as a damper in the first torque transmission path.

Torsional vibration dampers dampen occurring vibrations within a broad frequency range. However, the rotational irregularities occurring in the powertrain are not uniformly distributed, but rather have orders of excitation which are related, for example, to the firing frequency of the engine. In engines which are optimized with respect to $CO_2$ emissions and which generate greater rotational irregularities compared to conventional engines, certain excitation orders can no longer be damped satisfactorily by torsional vibration dampers.

SUMMARY OF THE INVENTION

Therefore, it is an object of the invention to provide a hydrodynamic coupling arrangement of the generic type in which an excitation order of rotational irregularities can be damped in a targeted manner when the lockup clutch is open and when the lockup clutch is closed.

This object is met by a hydrodynamic coupling arrangement, in particular a torque converter, comprising a housing that can be coupled to a driveshaft and which has an impeller, a turbine wheel arranged in an interior space of the housing that can be driven by the impeller, and a first damper arrangement by which the housing can be coupled to a driven member by a lockup clutch. The first damper arrangement comprises a first torsional vibration damper having a first primary side connected to the lockup clutch so as to be fixed with respect to rotation relative to it and a first secondary side rotatable with respect to the first primary side around an axis of rotation against the action of a first damper spring arrangement. A second torsional vibration damper having a second primary side connected to the first secondary side of the first torsional vibration damper so as to be fixed with respect to rotation relative to it and a second secondary side rotatable with respect to the second primary side around the axis of rotation against the action of a second damper spring arrangement. The turbine wheel is connected to an intermediate torsional vibration damper region so as to be fixed with respect to rotation relative to it, this intermediate torsional vibration damper region comprising the first secondary side and the second primary side, and a second damper arrangement having a deflection mass carrier connected to the second secondary side so as to be fixed with respect to rotation relative to it, at least one deflection mass being carried at the deflection mass carrier in such a way that a radial position of the at least one deflection mass with respect to the axis of rotation can be varied.

The second damper arrangement constructed as a speed-adaptive mass damper, as it is called, is used for specific damping of an excitation order generated by the powertrain. When rotational irregularities occur, the at least one deflection mass located at the most energy-efficient position in the centrifugal potential during a uniform rotational movement around the axis of rotation, is deflected counter to the centrifugal force, gains potential energy, and accordingly generates a counter-vibration which damps the rotational irregularity. A speed-adaptive mass damper can be specifically tuned to an excitation order, particularly to an excitation order that is generated by the firing frequency of the engine, since its resonance range shifts in the same manner as the excitation order as rotational speed increases.

Owing to the fact that the second damper arrangement is connected to the secondary side of the second torsional vibration damper, rotational irregularities transmitted by the turbine wheel as well as by the lockup clutch can be damped by the second damper arrangement. Regardless of whether the lockup clutch is closed or open, rotational irregularities generated by the engine are damped by the second torsional vibration damper as well as by the second damper arrangement.

The at least one deflection mass can be kept small through the cooperation of the first damper arrangement and second damper arrangement. This leads to the further advantages that the deflection mass carrier can be designed in such a way that it need only absorb the forces generated by a small mass and that, in case the at least one deflection mass is arranged in the interior of the housing, it is exposed to minor damping influences by the fluid in the hydrodynamic coupling arrangement because of its small surface.

In one embodiment of the invention, at least one deflection mass is arranged in radial direction between the first damper spring arrangement and the second damper spring arrangement so as to make better use of the installation space in the housing of the hydrodynamic coupling arrangement. This is made possible in that the at least one deflection mass can be arranged at this location due to its small size.

In order to make better use of the installation space inside the hydrodynamic coupling arrangement, it is preferably further provided that at least one deflection mass is arranged radially inside the lockup clutch and/or so as to axially overlap the lockup clutch. In this respect, it can also be provided that at least one deflection mass, the first damper arrangement and the turbine wheel are arranged successively in axial direction.

The radial distance of at least one deflection mass to the axis of rotation can be limited toward the inner side in that the at least one deflection mass contacts an outer circumferential region of the deflection mass carrier in a radial inner position. In this case, special steps for limiting the radial distance of the at least one deflection mass toward the inner side, such as stop elements arranged at the deflection mass carrier are not necessary.

To enable a deflection mass to be displaced radially, it can be provided that at least one deflection mass is coupled to the deflection mass carrier by at least one coupling element associated with this deflection mass and rotatably coupled to the deflection mass in a first coupling area and is rotatably coupled to the deflection mass carrier at a second coupling area located at a distance from the first coupling area. The maximum possible radial outer position of a deflection mass arranged in this way can therefore be adjusted through the distance between the first coupling area and second coupling area. Accordingly, the deflection mass carrier can be kept as small as possible in the radial direction, which results in a light deflection mass carrier with a low moment of inertia.

To stabilize the coupling connection to the deflection mass carrier, at least one deflection mass can be coupled to the deflection mass carrier by two coupling elements associated therewith and which are at a distance from one another in circumferential direction.

Another possibility for enabling radial displaceability of a deflection mass is that at least one deflection mass is coupled to the deflection mass carrier in at least two coupling areas located at a distance from one another so as to be movable with respect to the deflection mass carrier, every coupling area in the deflection mass carrier having a first guide path arrangement with vertex area located on the radially outer side and a second guide path arrangement in the deflection mass with vertex area located on the radially inner side and having a coupling bolt guided at the first guide path arrangement and at the second guide path arrangement so as to move along the latter. The displacement of the at least one deflection mass in radial direction is predetermined by the shape and curvature of the guide path arrangements when the at least one deflection mass is displaced in circumferential direction. In this way, the resonance behavior of the second damper arrangement comprising the at least one deflection mass can also be determined by the shape and the curvature of the guide path arrangements.

Another possibility for enabling the radial displaceability of a deflection mass is that at least one deflection mass is rotatably coupled to the deflection mass carrier at a coupling area. In this case, the at least one deflection mass which is rotatably coupled to the deflection mass carrier can be rotatable by 360°, i.e., to an unlimited extent, with respect to the deflection mass carrier so that the at least one deflection mass and the deflection mass carrier only contact at the coupling area. Mechanical stressing of the at least one deflection mass and of the deflection mass carrier in a mutual impact area can be prevented.

The present invention is further directed to a torque transmission arrangement, particularly a hydrodynamic torque converter, comprising a housing rotatable around an axis of rotation and which is filled, or can be filled, with fluid, a first friction surface arrangement connected to the housing so as to be rotatable together with the housing around the axis of rotation, a second friction surface arrangement which is connected to a driven member so as to be rotatable together with the driven member around the axis of rotation. The driven member has an inner toothing for rotational coupling with a driven shaft, a pressing element by which the friction surface arrangements can be brought into a frictional engagement and which divides an interior space of the housing into a first spatial area and a second spatial area, and comprising a flow guide element which adjoins the driven member axially and which at least partially limits a first flow path from/to the first spatial area and/or a second flow path from/to the second spatial area.

A torque transmission arrangement of the type mentioned above which is designed as a hydrodynamic torque converter is known from DE 10 2007 014 311 A1. In this known arrangement, the driven member constructed in the manner of a hub and connected to the second friction face formation by a torsional vibration damper arrangement and further connected to a turbine wheel for rotating jointly therewith is supported axially with respect to the housing arrangement, namely, the housing shell to be positioned facing the engine, by the flow guide element which is generally annularly constructed. For producing or canceling the frictional engagement between the two friction surface formations, the two fluid flow paths leading to the first spatial area and to the second spatial area are provided in order to increase the fluid pressure in the second spatial area with respect to the first spatial area or, if necessary, to reduce the fluid pressure in the first spatial area with respect to the second spatial area. These fluid flow paths comprise radial fluid passages which are formed in the flow guide element and which are basically axially open in the flow guide element and are terminated axially at one axial side by the driven member supported thereon and are terminated axially at the other axial side by the housing arrangement which supports the flow guide element axially. The supply and removal of fluid is carried out by way of two substantially coaxially arranged fluid channels formed in a driven shaft and which are open toward the radially outer side or axially in the end region of the driven shaft, i.e., beyond the area in which the driven shaft engages by an outer toothing provided at the driven shaft in a rotary coupling engagement with an inner toothing formed at the driven member. The rotational coupling between the driven member and the flow guide element is realized by a rotation-preventing device formed at opposing end face areas of the driven member and of the flow guide element.

One embodiment of the present invention is to provide a torque transmission arrangement constructed in a simple manner and which ensures a reliable functionality of the flow guide element.

According to one embodiment of the invention, this object is met through a torque transmission arrangement, particularly a hydrodynamic torque converter, comprising a housing rotatable around an axis of rotation and which is filled, or can be filled, with fluid, a first friction surface arrangement connected to the housing so as to be rotatable together with the housing around the axis of rotation, a second friction surface arrangement connected to a driven member so as to be rotatable together with the driven member around the axis of rotation. The driven member has an inner toothing for rotational coupling to a driven shaft, a pressing element by which the friction surface arrangements can be brought into frictional engagement and which divides an interior space of the housing into a first spatial area and a second spatial area, and comprising a flow guide element which axially adjoins the driven member and which at least partially defines a first flow path from/to the first spatial area and/or a second flow path from/to the second spatial area, wherein the flow guide element has an outer toothing that engages with the inner toothing of the driven member for rotational coupling of the driven member to the flow guide element.

An important aspect of this construction according to one embodiment of the invention consists in that a formation already provided at the driven member, namely, the inner toothing thereof, can be used for the rotational coupling between the driven member and the flow guide element. Accordingly, any machining steps at least in the area of the driven member can be omitted in order to be able to provide the additional possibility of rotational coupling with the flow guide element. Further, the rotational coupling of the flow guide element to the driven member provided according to one embodiment of the invention does not limit the possibilities of forming formations at the flow guide element which serve to guide fluid to and from the various spatial areas formed in the housing arrangement.

The flow guide element can have, for example, a toothing projection that engages in the driven member and carries the outer toothing. For reasons of stability and ease of manufacture, the toothing projection can preferably be constructed annularly.

To ensure that the region in which the driven member adjoins the flow guide element can be used for flow guidance, it is further proposed that the inner toothing and the outer toothing engage with one another in a rotational coupling while retaining at least one flow passage. This can be achieved, for example, in that the outer toothing has a smaller quantity of teeth than the inner toothing. In those locations where teeth are absent in the outer toothing but present in the inner toothing, there is a comparatively large intermediate space between the driven member and the flow guide element which allows fluid to pass through.

It can be provided particularly for the supply and removal of fluid to and from the first spatial area that the flow guide element has, at its front side region facing the driven member, a plurality of first radial fluid passages which are open axially in the flow guide element. In so doing, the toothing region, for example, can define the first fluid passages on the radially inner side.

The supply of fluid to the second spatial area can be ensured in that the flow guide element has at its front side region remote of the driven member a plurality of second radial fluid passages which are axially open at the flow guide element. A defined positioning of the driven member in the housing arrangement can be ensured in that the driven member is supported axially at the housing by the flow guide element.

Further, for damping rotational irregularities in a powertrain, it can be provided that the second friction surface arrangement is connected to the driven member to rotate together with the latter around the axis of rotation by a torsional vibration damper arrangement.

When the torque transmission arrangement is constructed as a hydrodynamic torque converter, it can be provided that the housing has an impeller and that a turbine wheel connected to the driven member so as to rotate together with the latter around the axis of rotation is provided in the first spatial area.

It is noted in this connection that each aspect of the invention mentioned above, i.e., the provision of a damper arrangement operating with deflection masses on the one hand and the special embodiment of a flow guide element axially adjoining a driven member on the other hand, is considered as the subject matter of the invention by itself but, of course, also in combination with any group of features of the other respective aspect.

Embodiments of this invention are also directed to a drive system having a hydrodynamic coupling arrangement or torque transmission arrangement according to the invention arranged in the torque transmission path between a drive unit and a transmission. In this respect, the first damper arrangement and the second damper arrangement are preferably tuned to the rotational irregularity characteristics and the excitation orders of the drive system.

BRIEF DESCRIPTION OF DRAWINGS

The present invention will be described in more detail in the following referring to the accompanying drawings based on preferred embodiment forms. In the drawings.

DETAILED DESCRIPTION OF DRAWINGS

Figure 1:
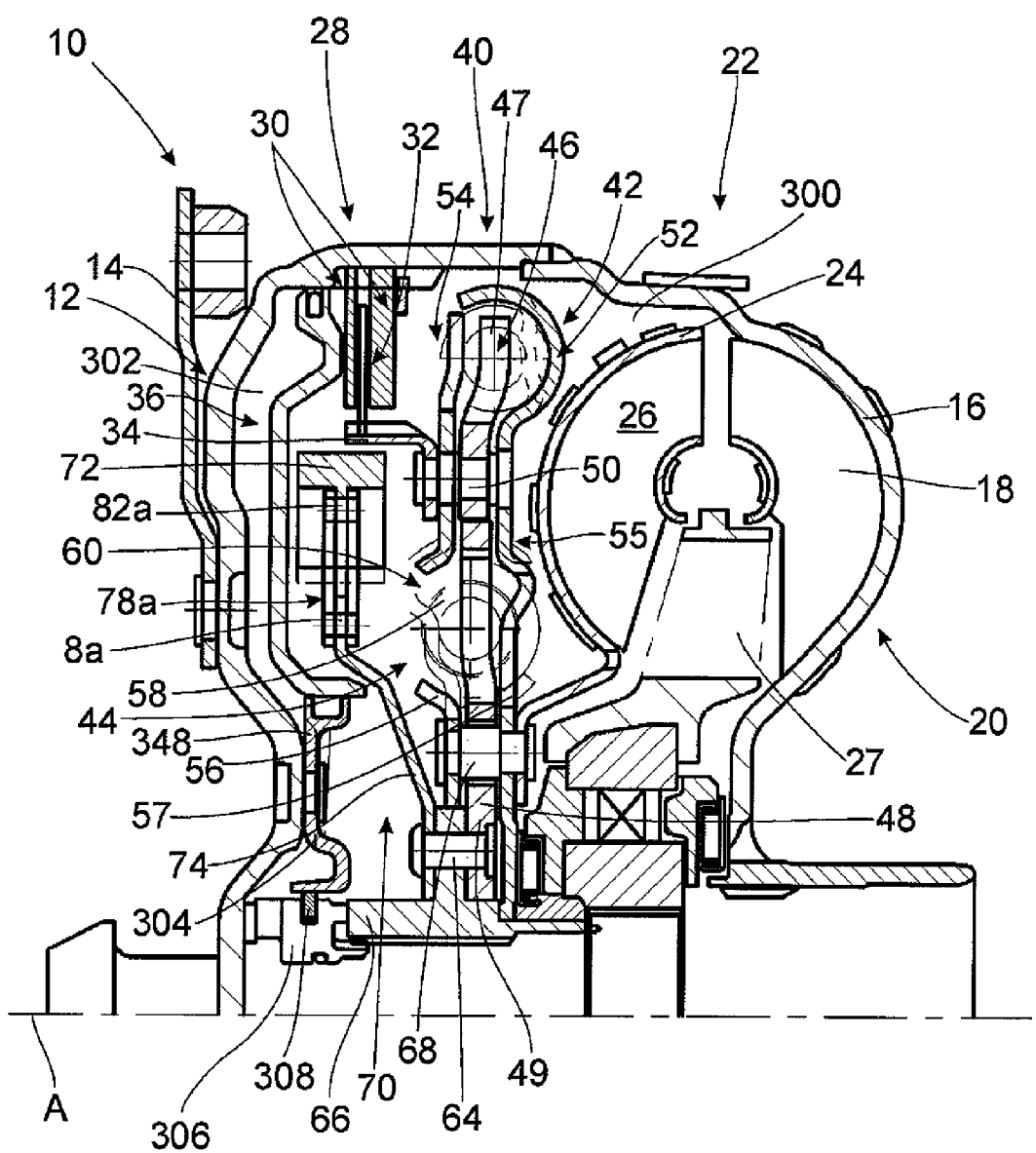
FIG. 1 is a partial longitudinal section through a hydrodynamic torque converter.

A hydrodynamic torque converter, designated generally by 10, is shown in partial longitudinal section in FIG. 1. The hydrodynamic torque converter 10 comprises a housing 12 which can be coupled to the drive unit of a motor vehicle by a coupling disk 14. At the end located opposite from the coupling disk 14 in axial direction, the housing 12 has an impeller shell 16 having a plurality of impeller vanes 18. The impeller shell 16 and the plurality of impeller vanes 18 together form an impeller 20 which can drive a turbine wheel 22 arranged in the interior of the housing 12. The turbine wheel 22 in turn comprises a turbine wheel shell 24 and a plurality of turbine wheel blades 26. A stator 27 whose task it is to deflect fluid expelled from the turbine wheel 22 and direct it to the impeller 20 is arranged between the impeller 20 and the turbine wheel 22.

Further, a lockup clutch 28 is arranged in the interior of the housing 12. This lockup clutch 26 comprises a first friction surface arrangement 30 connected to the housing 12 to be fixed with respect to rotation relative to it, a second friction surface arrangement 32, a friction element carrier 34 connected to the second friction surface arrangement 32 to be fixed with respect to rotation relative to it, and a clutch piston 36. The clutch piston 36 can be displaced in axial direction to produce a friction connection of the first friction surface arrangement 30 to the second friction surface arrangement 32. The clutch piston 36 acting as pressing element divides the interior of the housing 12 into a first spatial area 300 containing the turbine wheel 22 and the two friction surface arrangements 30, 32 and a second spatial area 302. The second spatial area 302 is closed toward the radially outer side in that the clutch piston 36 adjoins the housing 12 so as to be substantially tight against fluid. On the radially inner side, the clutch piston 36 is guided so as to be axially movable in a fluid-tight manner on an annular guide element 304 which is fixedly connected, e.g., by riveting, to the housing 12. The guide element 304 is in turn connected in its radially inner area to a flow guide element 306 in a fluid-tight manner by a sealing ring 308 which is inserted in the flow guide element 306 so that a substantially completely fluid-tight separation between the first spatial area 300 and the second spatial area 302 can be provided proceeding radially outward from the flow guide element 306.

Further, a first damper arrangement 40 having a first torsional vibration damper 42 and a second torsional vibration damper 44 which is located farther toward the inside radially with respect to the first torsional vibration damper 42 is arranged in the interior of the housing 12 in axial direction between the lockup clutch 28 and the turbine wheel 22.

The first damper arrangement 40 has a first primary side 46 having a radially outer central disk 47 of the first torsional vibration damper 42 and a second secondary side 48 having a radially inner central disk 49 of the second torsional vibration damper 44. The radially outer central disk 47 is rotatably supported on the radially inner central disk 49 and is rotatable around the axis of rotation A with respect to a first secondary side 54 of the first torsional vibration damper 42 against the action of a first damper spring arrangement 52. The first secondary side 54 comprises a radially outer region of an intermediate torsional vibration damper region 55 having two cover disks 56 and 57 whose radially inner area forms a second primary side 60 of the torsional vibration damper 44. The second primary side 60 of the second torsional vibration damper 44 is rotatable around the axis of rotation A with respect to the radially inner central disk 49 against the action of a second damper spring arrangement 58. For transmitting torque, the radially outer central disk 47 is connected by a plurality of coupling bolts 50 to the friction element carrier 34 so as to be fixed with respect to rotation relative to it and the radially inner central disk 49 is connected by a plurality of coupling bolts 64 to a driven member 66 of the hydrodynamic torque converter 10 so as to be fixed with respect to rotation relative to it, this driven member 66 being constructed as a driven hub. The transmission input shaft of the powertrain of the motor vehicle can be connected to the driven member 66.

The turbine wheel 22 is secured by the radially inner end of the turbine wheel shell 24 to the cover plate 57 by a plurality of coupling bolts 68, which also connect the two cover disks 56 and 57 to one another such that they are fixed with respect to rotation relative to one another, and is accordingly connected to the second primary side 60 of the second torsional vibration damper 44 and to the intermediate torsional vibration damper region 55 so as to be fixed with respect to relative rotation. When the lockup clutch 28 is open, torque can be transmitted along a first torque transmission path from the housing 12 via the impeller 20 and turbine wheel 22 to the driven member 66 via the second torsional vibration damper 44. When the lockup clutch 28 is closed, torque can be transmitted along a second torque transmission path from the housing 12 to the driven member 66 via the first torsional vibration damper 42 and the second torsional vibration damper 44.

In addition to the first damper arrangement 40, a second damper arrangement 70 is arranged in the interior of the housing 12 and is connected to the driven member 66 to be fixed with respect to rotation relative to it. The second damper arrangement 70 comprises a deflection mass 72 and a deflection mass carrier 74 secured to the side of the driven member 66 located opposite the turbine wheel 22 in axial direction by the plurality of coupling bolts 64. The deflection mass 72 is arranged in radial direction between the first damper spring arrangement 52 and the second damper spring arrangement 58 radially inside the lockup clutch 28 and so as to overlap the latter axially. The deflection mass 72, the first damper arrangement 40 and the turbine wheel 22 are arranged successively in axial direction.

Figure 2:
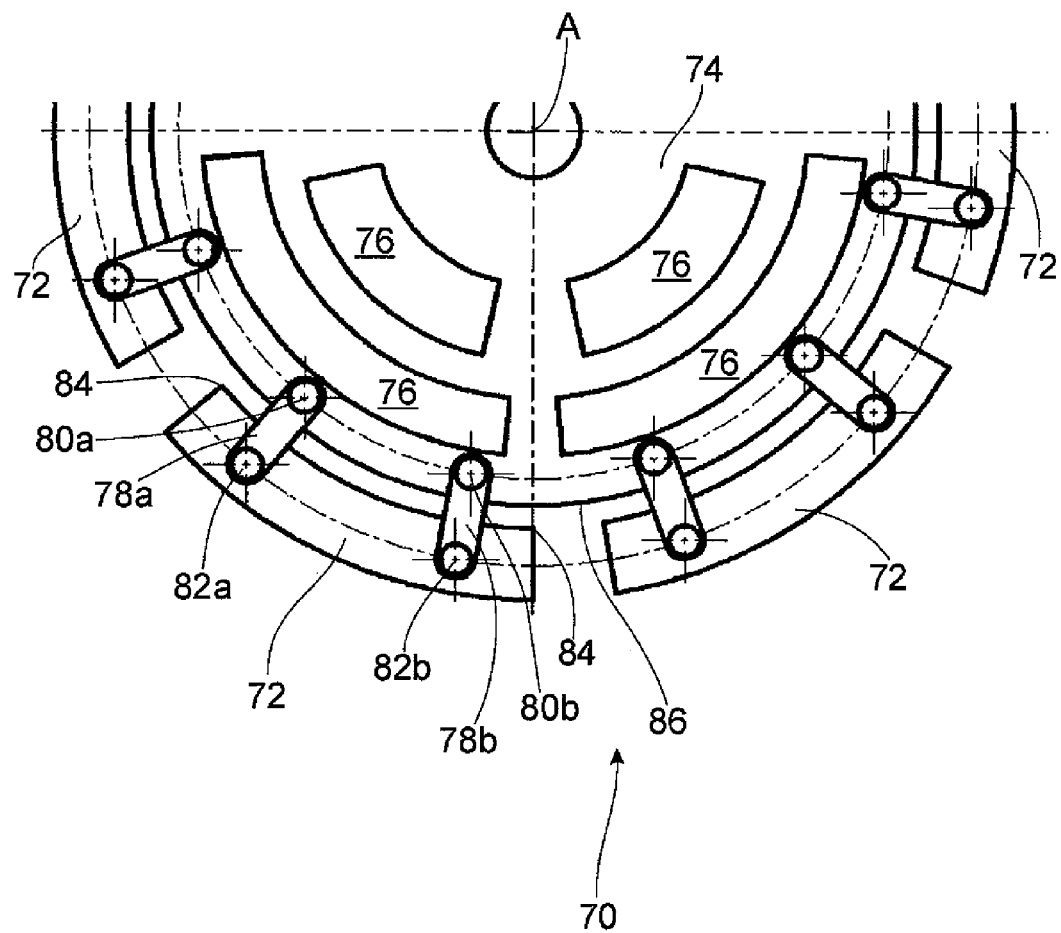
FIG. 2 is an axial view of a first embodiment form of a second damper arrangement that can be used in the torque converter shown in FIG. 1.

An axial view of a first embodiment form of the second damper arrangement 70 shown in FIG. 2 has a plurality of deflection masses 72 which are arranged successively at regular intervals around the axis of rotation A. Each of the deflection masses 72 is coupled by a first coupling element 78a and a second coupling element 78b to the deflection mass carrier 74 which has a plurality of openings 76 arranged successively in circumferential direction in order to economize on weight. The first coupling element 78a is rotatably coupled to the deflection mass carrier 70 in a first radially inner coupling area by a coupling bolt 8a; the second coupling element 78b is rotatably coupled to the deflection mass carrier 70 in a second radially inner coupling area located at a distance from the first radially inner coupling area in circumferential direction by a coupling bolt 80b shown in FIG. 2. Further, the first coupling element 78a is rotatably coupled to the deflection mass 72 associated with it in a first radially outer coupling area by a coupling bolt 82a; the second coupling element 78b is rotatably coupled to deflection mass 72 in a second radially outer coupling area located at a distance from the first radially outer coupling area in circumferential direction by a coupling bolt 82b. In the position of the deflection masses 72 shown in the present case, in which these deflection masses 72 or their centers of mass are located farthest from the axis of rotation A, the coupling elements 78a and 78b face radially outward in the present embodiment form. Proceeding from this radial outer position, the deflection masses 72 can move in circumferential direction relative to the deflection mass carrier 70. During a relative movement relative to the deflection mass carrier 70, the deflection masses 72 or their centers of mass approach the latter increasingly in circumferential direction until they contact the outer circumferential area 86 of the deflection mass carrier 70 by their inner edge and occupy a radial inner position.

The deflection masses 72 shown in FIG. 2 are plate-shaped and can be constructed so as to be narrower in axial direction than in radial direction. In contrast, it can be seen from FIG. 1 that the area of the deflection mass 72 located radially outside the coupling bolt is wider in axial direction than the area serving for coupling so that the center of mass of the deflection mass 72 shown in FIG. 1 is located as far as possible toward the radially outer side and the moment of inertia of this deflection mass 72 is increased.

Figure 3:
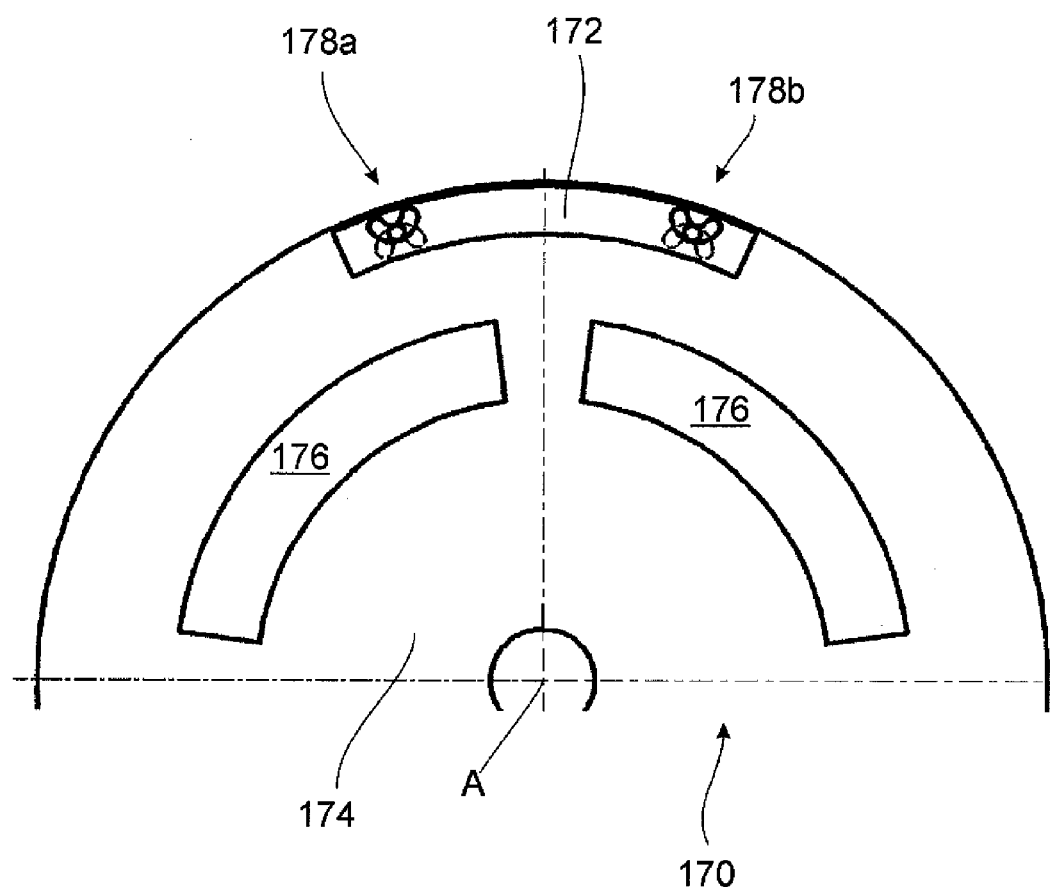
FIG. 3 is a second embodiment form of a second damper arrangement.

A second embodiment form of a second damper arrangement 170 is shown in FIG. 3. A deflection mass carrier 174 which, like deflection mass carrier 74, can be connected to the driven member 66 of the hydraulic torque converter 10 so as to be fixed with respect to rotation relative to it and which in order to economize on material has a plurality of openings 176 successively in circumferential direction is coupled to a deflection mass 172 by two coupling areas 178a and 178b.

Figure 4:
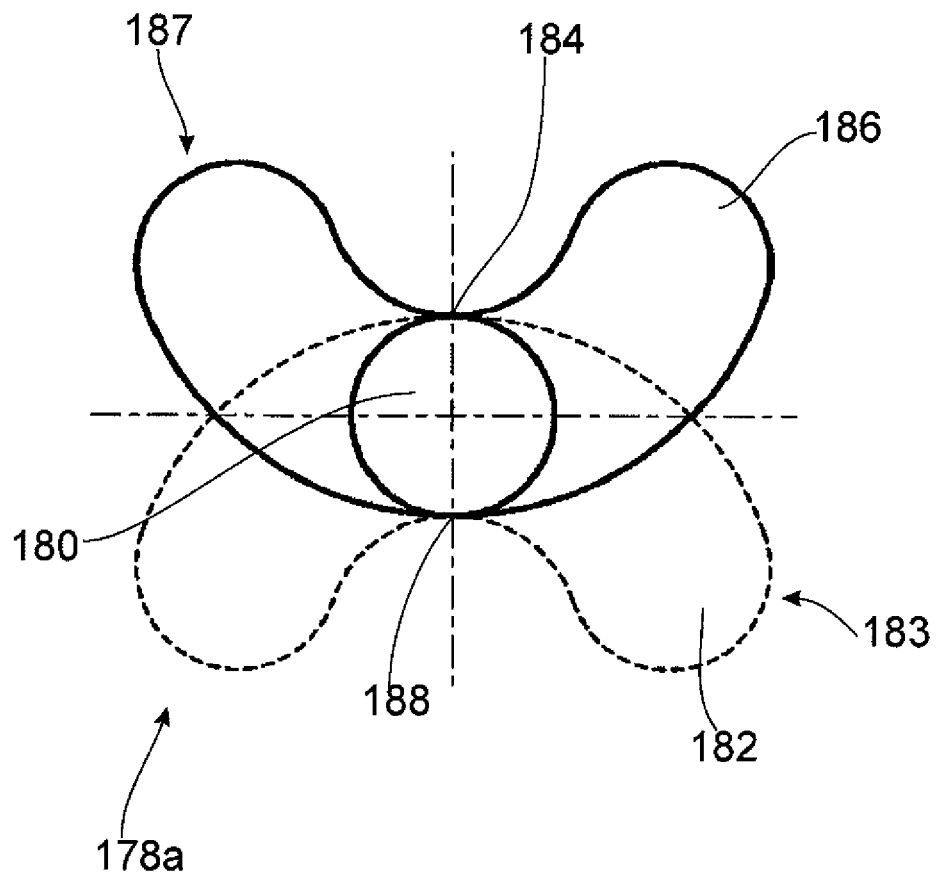
FIG. 4 is an enlarged view in axial direction of one of the coupling areas of the second damper arrangement from FIG. 3.

The coupling area 178a illustrated in FIG. 3 is shown in an enlarged view in FIG. 4. A first guide path arrangement 182 in the deflection mass carrier 174 with vertex region 184 located on the radially outer side is movably coupled by a coupling bolt 180 to a second guide path arrangement 186 in the deflection mass 172 with vertex region 188 on the radially inner side. The coupling bolt 180 is movable along the first guide path arrangement 182 and the second guide path arrangement 186 and is guided by the guide path arrangements 182 and 186. In the radially outer position shown in FIG. 3, the deflection mass 172 or its center of mass is located at the greatest distance from the axis of rotation A. When the deflection mass 172 moves in circumferential direction relative to the deflection mass carrier 174, the deflection mass 172 is guided radially inward by the coupling arrangements 178a and 178b until, for example, the coupling bolt 180 shown in FIG. 4 contacts the end 183 of guide path 182 and the end 187 of guide path 186 and the deflection mass 172 occupies one of two possible radial inner positions.

Only one deflection mass is shown in FIG. 3. A plurality of deflection masses which are constructed identically to deflection mass 172 are preferably arranged successively around the axis of rotation A and are coupled to deflection mass carrier 174 in exactly the same way as deflection mass 172.

Figure 5:
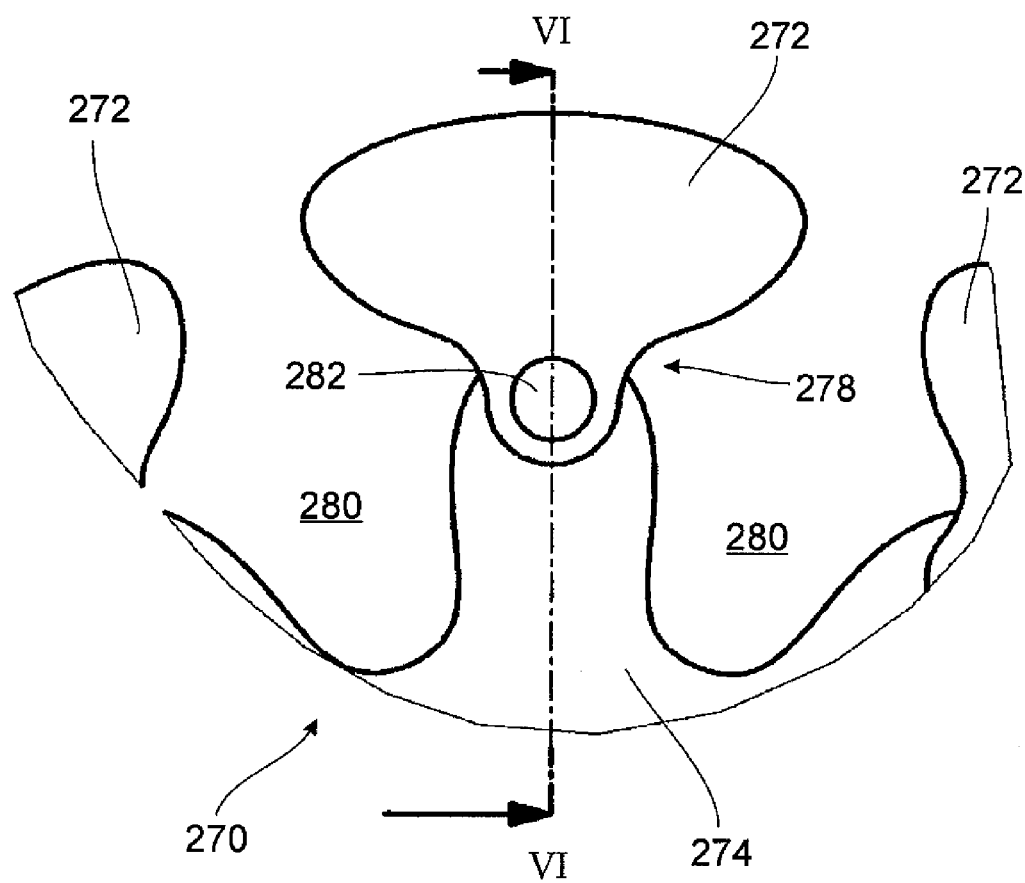
FIG. 5 is a partial view in axial direction of a third embodiment form of a second damper arrangement.

A partial view in axial direction of another embodiment form of a second damper arrangement 270 is shown in FIG. 5. A deflection mass 272 is rotatably coupled to a deflection mass carrier 274 by a coupling bolt 282 in a coupling area 278. The deflection mass carrier 274 can be connected to the driven member 66 of the hydraulic torque converter 10 so as to be fixed with respect to rotation relative to it exactly like deflection mass carrier 74. To economize on material and weight, the deflection mass carrier 270 has notches 280 so that the deflection mass 272 is supported at an arm formed by the deflection mass carrier 274. The deflection mass 272 is pear-shaped so that its center of mass is as far as possible from the coupling bolt 282. In the radial outer position of the deflection mass 272 shown in FIG. 5, its center of mass is as far as possible from the axis of rotation A. In the event of rotational irregularities, the deflection mass 272 or its center of mass is deflected in circumferential direction relative to the deflection mass carrier 274 and approaches the axis of rotation A. FIG. 5 shows other partial deflection masses which are constructed identically to deflection mass 272 and which are arranged together with deflection masses 272 successively in circumferential direction.

Figure 6:
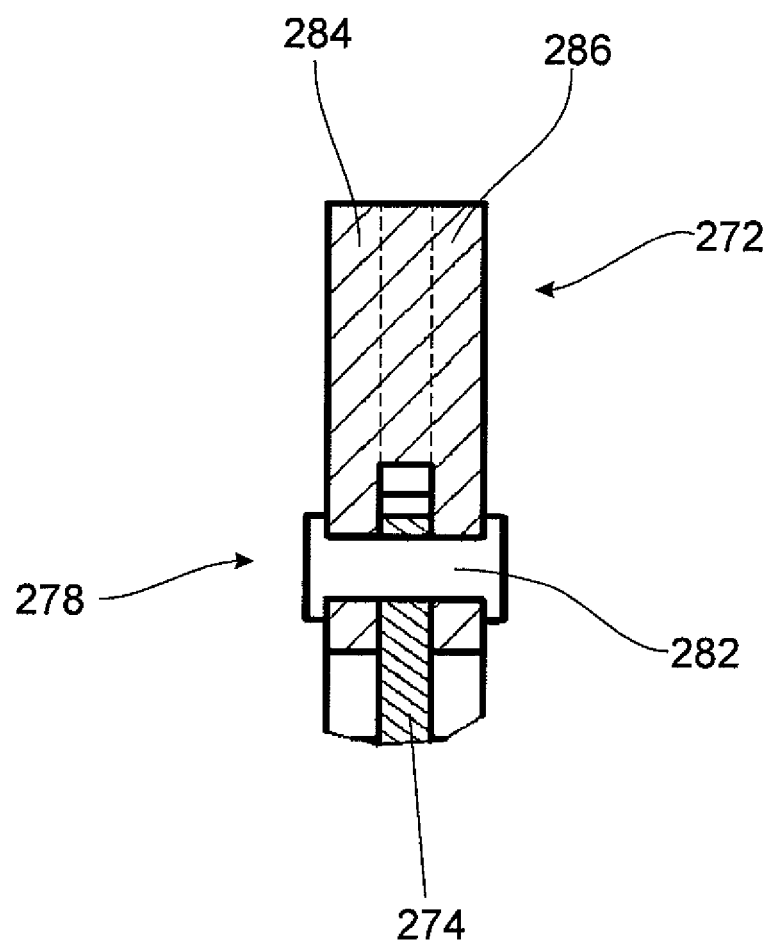
FIG. 6 is a partial longitudinal section through the second damper arrangement from FIG. 5 along line VI-VI in FIG. 5.

FIG. 6 shows a partial longitudinal section along line VI-VI from FIG. 5. It can be seen that the deflection mass 272 encloses the deflection mass carrier 274 in a fork-like manner in coupling area 278 and is rotatably coupled to the deflection mass carrier 274 by coupling bolt 282. As is shown in FIG. 6, the deflection mass 272 can be formed integrally from an individual structural component part. However, as is indicated by dashed lines, the deflection mass 272 could also be formed from two identically constructed, separate structural component parts 284 and 286 connected to one another by the coupling bolt 282 so as to be rotatable relative to the deflection mass carrier 270. In this way, the deflection mass formed from the two structural component parts 284 and 286 can be rotated with respect to the deflection mass carrier 274 by 360° or more.

Another aspect of the invention which can be realized in combination with the aspects mentioned in detail above or independently in a torque transmission arrangement such as, e.g., a hydraulic torque converter, or in a wet clutch or the like, will be described in the following with reference to FIGS. 7 to 11. In this case, the basic construction of the torque transmission arrangement is the same as that described above and has a housing 12 which is rotatable around an axis of rotation A, the two friction surface arrangements 30, 32 which can be brought into frictional engagement by the clutch piston 36, one 30 of which friction surface arrangements 30, 32 is coupled to the housing 12, and friction surface arrangement 32 is coupled—in the present example by the damper arrangement 40 to which the turbine wheel 22 is also coupled—to the driven member 66, which is constructed as a driven hub, so as to rotate together with it around the axis of rotation A.

Figure 7:
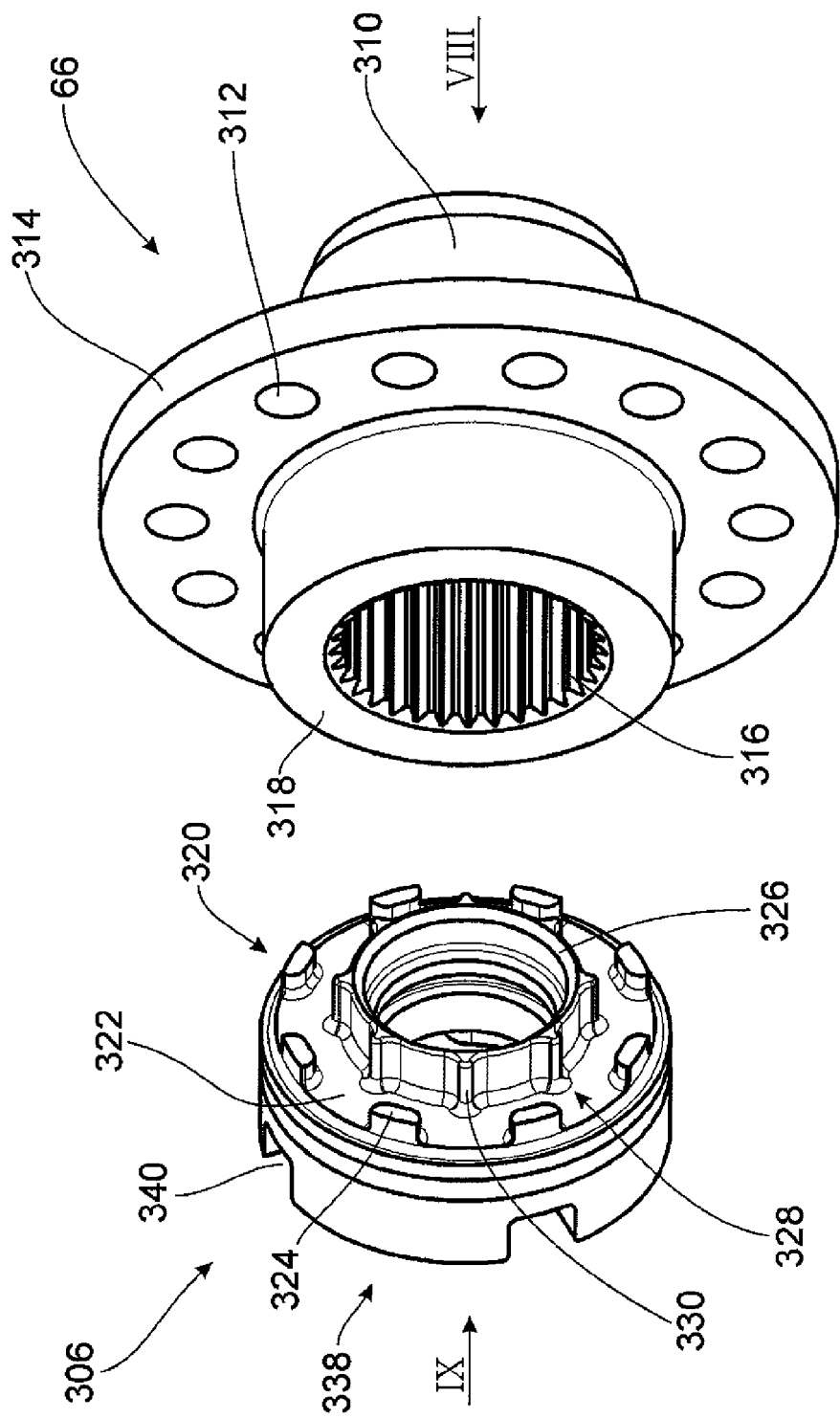
FIG. 7 is a perspective view of a driven member constructed as a driven hub and a flow guide element associated therewith.

FIG. 7 shows the two structural component parts, i.e., the driven hub or driven member 66 and flow guide element 306, which are arranged adjoining one another axially. The driven member 66 is constructed with an approximately annular or cylindrical body region 310 having at its outer circumference a connection flange 314 formed with rivet connection openings 312 for fixedly connecting the damper arrangement 40, for example. The driven member 66, with its body region 310 and connection flange 314, can be produced as an integral structural component part. The body region 310 is annular, i.e., hollow at the inside, and has an inner circumferential toothing 316 that can be introduced axially into a rotational coupling engagement with a corresponding outer toothing at a driveshaft, e.g., of a transmission input shaft. In this way, the driven member 66 can be coupled to a driven shaft to be fixed with respect to rotation relative to it. The inner toothing 316 extends axially in the body region 310 of the driven member 66 up to a front side region 318 at which the driven member 66 is supported axially with respect to the flow guide element 306.

In its front side region 320 located opposite front side region 318, the flow guide element 306 has a plurality of projections 324 which between themselves define radial passages 322 that can be supported axially at the front side region 318 of the body region 310. The radial passages 322 are accordingly formed in the flow guide element 306 so as to open axially at the front side region 320 and are covered or closed axially by the body region 310 of the driven member 66 in the assembled state.

The flow guide element 306, which in principle also has an annular contour, i.e., is open in its radially inner area, has an annular toothing projection 326 at its front side region 320. This toothing projection 326 forms an integral component part of the flow guide element 306 and, at its outer side, carries an outer circumferential toothing 328 having a plurality of axially extending teeth 330 which are uniformly distributed in circumferential direction and project toward the radially outer side. The outer toothing 328 is constructed in such a way that a rotational coupling is realized between the driven member 66 and the flow guide element 306 with the inner toothing 316 at the driven member 66 in the assembled state.

Figure 8:
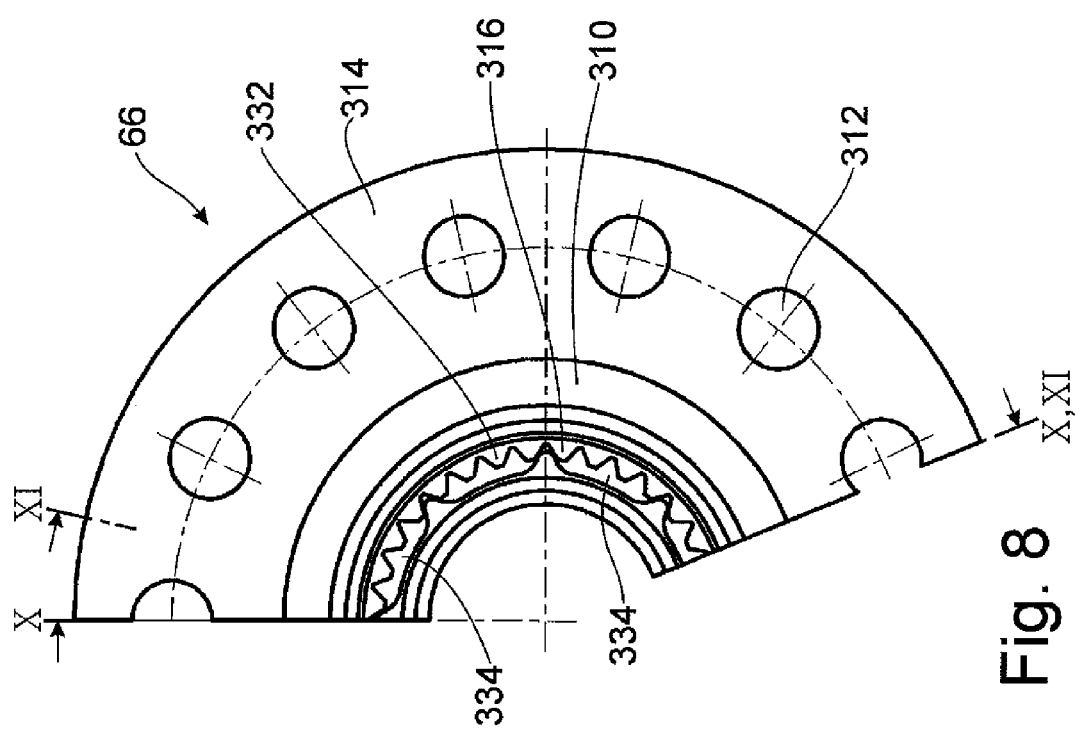
FIG. 8 is a partial axial view through the two components in FIG. 7, assembled and considered in viewing direction VIII in FIG. 7.
Figure 10:
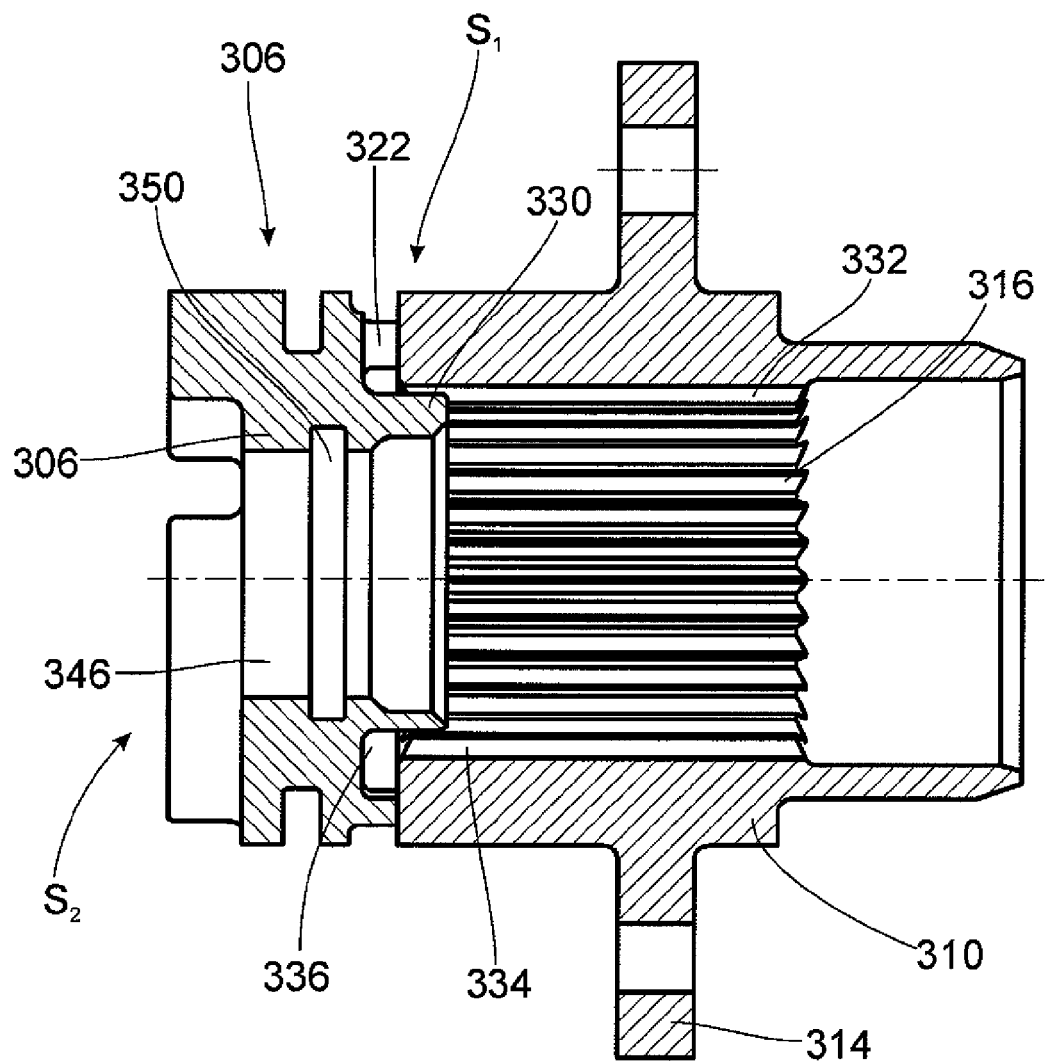
FIG. 10 are the two components from FIG. 7 in longitudinal section and assembled, in section along line X-X in FIG. 8.
Figure 11:
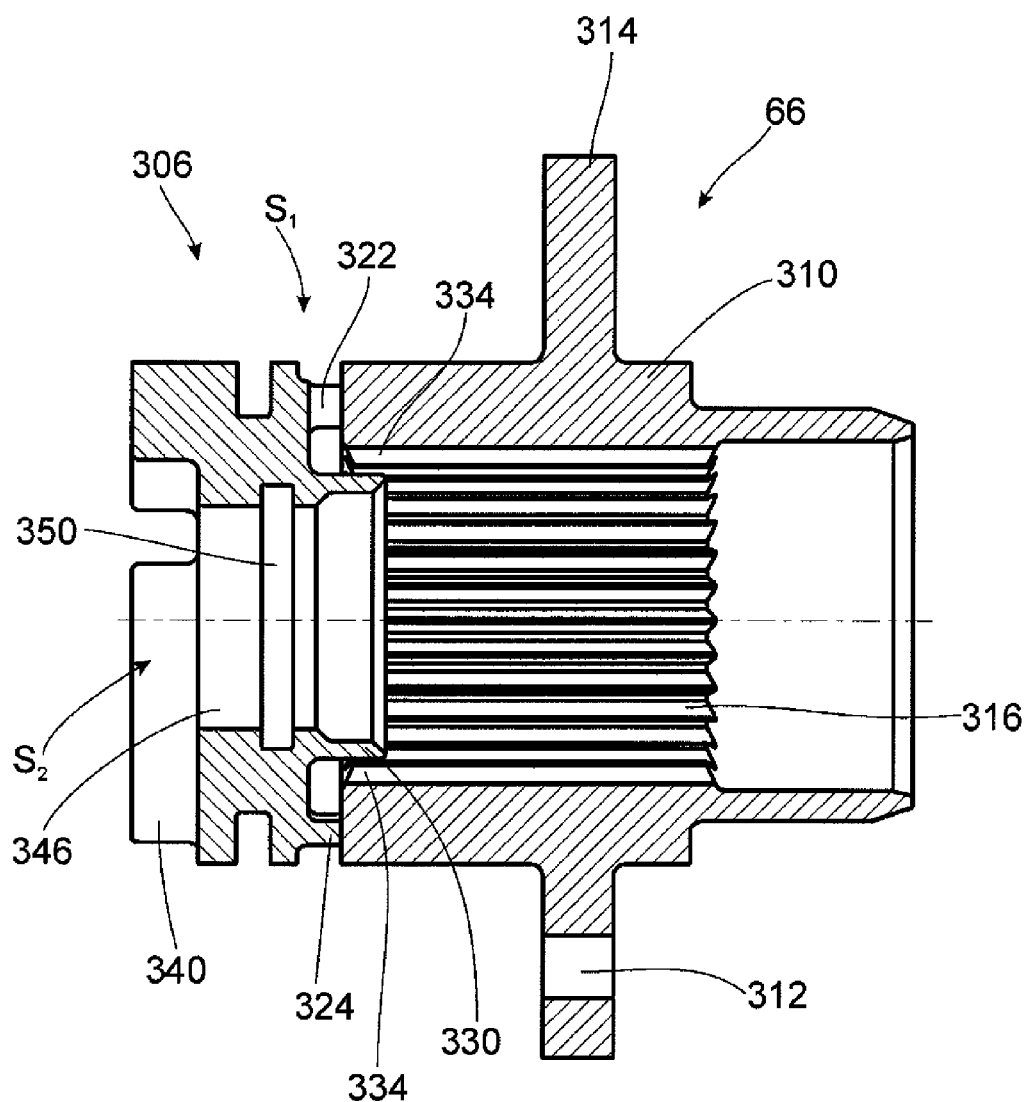
FIG. 11 is a view corresponding to FIG. 10 in section along a line IX-IX in FIG. 8.

This rotational coupling state can be seen especially in FIGS. 8 and 10. The axial view therein shows the inner toothing 316 at the body region 310 with teeth 332 which project radially inward and extend axially. A tooth 330 of the outer toothing 328 which projects radially outward, projects between every two such teeth 332. The engagement is preferably such that the relative rotational play between the driven member 66 and the flow guide element 306 is as small as possible; ideally, there is no relative movement play.

The quantity of teeth 330 of the outer toothing 328 is less than the quantity of teeth 332 of the inner toothing 316. As a result, flow passages 334 are formed in circumferential direction between every two such teeth 330 of the outer toothing 328 and radially between the toothing projection 326 and the body region 310. Since a plurality of flow passages 334 of this kind are distributed along the circumference, there is a comparatively large total flow cross section. These flow passages 334 axially adjoin the fluid passages 322 defined toward the radially inner side by the toothing projection 326 and are connected to one another and also to the flow passages 334 at their radially inner area by an annularly open channel area 336. In this way, a first flow path $S_1$ is defined which opens radially outward toward the first spatial area 300 and accordingly allows fluid to flow into and also out of the first spatial area 300. The flow can then be guided further via a flow channel which is formed in a transmission input shaft and which opens toward the radially outer side.

It will be seen from FIG. 7 that the quantity of projections 324 and the quantity of teeth 330 are identical and that they are positioned in circumferential direction in such a way that a tooth 330 lies in each instance between two projections 324 in circumferential direction, i.e., is positioned approximately in the center in circumferential direction with respect to a respective fluid passage 322. As a result of this positioning, the teeth 330 assist in the deflection of the fluid in flowing radially outward to the first spatial area 300, particularly in that axial area in which they no longer engage in the body region 310 of the driven member 66. Of course, it is possible that the teeth 330 can also be positioned to be oriented in circumferential direction with the projections 324, which further reduces the throttling effect formed in the transition between the flow passages 334 and the fluid passages 322.

Figure 9:
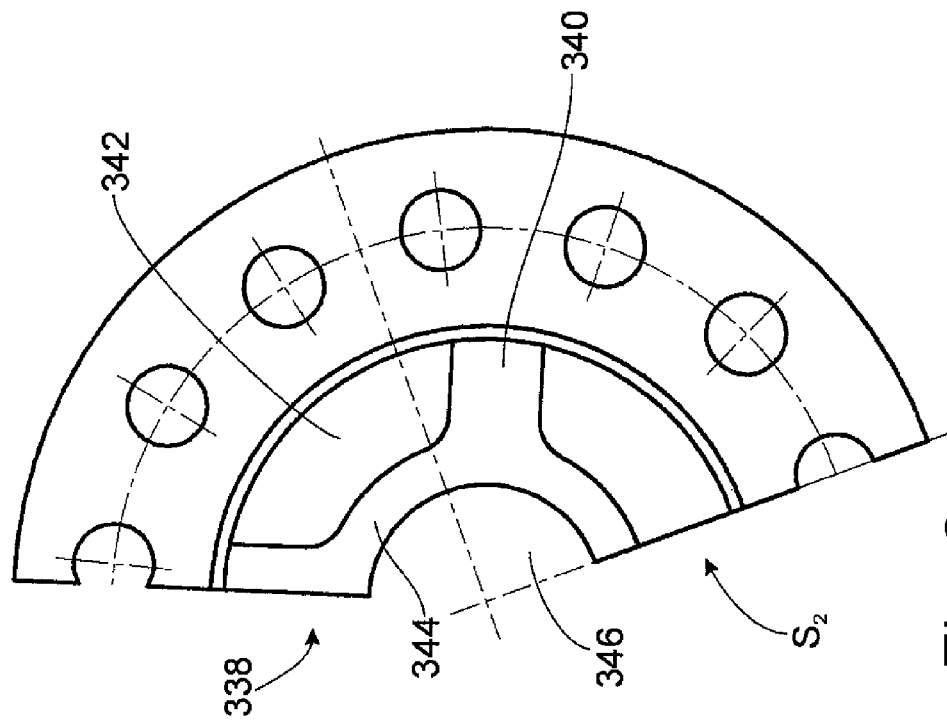
FIG. 9 is a view corresponding to FIG. 8 considered in viewing direction IX in FIG. 7.

At its front side region 338 remote of the driven member, which can be seen in axial view in FIG. 9, the flow guide element 306 likewise has a plurality of projections 342 which are arranged successively in circumferential direction and which define between themselves radial fluid passages 340. The flow guide element 306 is supported by these projections 342 with respect to the housing 12, for example, directly or with the intermediary of another bearing element. The fluid passages 340 communicate with one another on the radially inner side by a channel area 344 and with the opening space 346 formed in the interior of the flow guide element 306. In this way, a second flow path $S_2$ is defined along which fluid can be guided to and from the second spatial area 302. In order to achieve a connection to the second spatial area 302, a plurality of channels 348 can be formed in the guide element 304 shown in FIG. 1, these channels 348 traversing the guide element 304 radially. The flow can be guided further along a flow channel formed in the transmission input shaft and which opens toward the opening space 346, for example, at the axial front side of the transmission input shaft. In order to close the two flow paths $S_1$ and $S_2$ so that they are fluid-tight with respect to one another, a sealing ring that contacts the outer circumference of the driven shaft in a fluid-tight manner can be inserted into an inner circumferential groove 350 of the flow guide element 306. Further, a sealing ring (308 in FIG. 1) which contacts the inner circumference of the guide element 304 shown in FIG. 1 in a fluid-tight manner can likewise be inserted into an outer circumferential groove 305. It is noted in this connection that the transmission input shaft can be designed in principle in the manner shown in FIG. 1 of DE 10 2007 014 311 A1, for example. In this case, the transmission input shaft is constructed as a hollow shaft in which a cylindrical dividing wall is inserted by which the two concentrically arranged flow channels formed therein are separated from one another and which is secured to the transmission input shaft in a fluid-tight manner near the axial end region of the transmission input shaft, approximately at that location where the fluid-tight closure with respect to the flow guide element is also realized, in order to separate the flow channels formed therein from one another in a fluid-tight manner. The radially inner flow channel of the two flow channels is then open toward the axial end of the transmission input shaft, i.e., toward the opening space 346 in FIG. 10. The radially outer, substantially annular flow channel opens through a plurality of openings in an axial area which lies substantially between the toothing projection 326 of the flow guide element 306 and the outer toothing which is provided at the transmission input shaft and which is in a coupling engagement with the inner toothing 316. It is self-evident that other configurations of a transmission input shaft are also possible, for example, with two flow channels which are not coaxial to one another, one of which is open axially while the other is open radially, for example.

Owing to the above-described embodiment of the flow guide element, particularly its rotational coupling to the driven member by means of the inner toothing of the driven member and an outer toothing provided at the flow guide element, a simple construction can be realized which requires no additional machining steps at the driven member, but which at the same time ensures a reliable supply and removal of fluid to and from the two spatial areas. The two structural component parts, i.e., the driven member and flow guide element, which, in their entirety, ultimately define a two-part hub can be easily producible with the formations to be provided thereat and also provide for a reliable functionality particularly with respect to the rotational coupling, since it is not necessary to rely on any press fits or the like. Also, it is not necessary to introduce bore holes to enable a fluid passage because, on principle, the passages formed for this purpose at the flow element open axially and are closed in axial direction by the two structural component parts adjoining the flow guide element.

Further, the construction of the flow guide element according to the invention and its rotational coupling with the driven member, which can also be produced in a simple manner by moving them together axially, makes it possible to carry out the process of construction of a torque transmission arrangement, e.g., also of a hydraulic torque converter, in a simple manner. In particular, after the friction surface arrangements and the clutch piston have been inserted, to be followed by insertion of the damper arrangement with the turbine wheel supported thereon and the driven member, the flow guide element can be inserted initially and used to place the second spatial area under pressure by a corresponding supply of fluid. In this way, the clutch piston brings the friction surface arrangements into a frictional engagement and accordingly holds particularly the friction surface arrangement connected to the damper arrangement such that they are fixed with respect to relative rotation. This is especially advantageous when the friction surface arrangement comprises a plurality of friction elements or plates which can accordingly be fixed in a defined manner and allows the damper arrangement with the inner disk carrier to be fitted axially without further rotation of individual friction elements or plates.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A hydrodynamic coupling arrangement configured as a torque converter, comprising:
   a lockup clutch;
   an impeller;
   a turbine wheel;
   a housing having an interior space in which the impeller and the turbine wheel are arranged and configured to be coupled to a driveshaft and driven by the impeller;
   a first damper arrangement configured to couple the housing to a driven member by the lockup clutch, wherein the first damper arrangement comprises:
      a first torsional vibration damper having a first primary side connected to the lockup clutch;
      a first secondary side that is rotatable with respect to the first primary side around an axis of rotation against an action of a first damper spring arrangement;
      a second torsional vibration damper having a second primary side connected to the first secondary side of the first torsional vibration damper;
      a second secondary side rotatable with respect to the second primary side around the axis of rotation against the action of a second damper spring arrangement; and
      an intermediate torsional vibration damper region comprising the first secondary side, the second primary side, and a second damper arrangement having a deflection mass carrier connected to the second secondary side, at least one deflection mass being carried at the deflection mass carrier such that a radial position of the at least one deflection mass with respect to the axis of rotation can be varied is connected to the turbine wheel,
   wherein a coupling region of the at least one deflection mass is arranged in a radial direction substantially at a middle between the first damper spring arrangement and the second damper spring arrangement.

2. The hydrodynamic coupling arrangement according to claim 1, wherein at least one deflection mass, the first damper arrangement and the turbine wheel are arranged successively in an axial direction.

3. The hydrodynamic coupling arrangement according to claim 1, wherein the at least one deflection mass contacts an outer circumferential area of the deflection mass carrier at a radial inner position of the at least one deflection mass.

4. The hydrodynamic coupling arrangement according to claim 1, wherein the at least one deflection mass is coupled to the deflection mass carrier by at least one coupling element associated with this deflection mass that is rotatably coupled to the deflection mass in a first coupling area and is rotatably coupled to the deflection mass carrier at a second coupling area located at a distance from the first coupling area.

5. The hydrodynamic coupling arrangement according to claim 4, wherein the at least one deflection mass is coupled to the deflection mass carrier by two coupling elements that are at a distance from one another in a circumferential direction.

6. The hydrodynamic coupling arrangement according to claim 1, wherein the at least one deflection mass is coupled to the deflection mass carrier in at least two coupling areas located at a distance from one another to be movable with respect to the deflection mass carrier, wherein the coupling areas in the deflection mass carrier have a first guide path arrangement with a first vertex area located on the radially outer side and a second guide path arrangement in the deflection mass with a second vertex area located on the radially inner side and has a coupling bolt which is guided at the first guide path arrangement and at the second guide path arrangement so as to move along the latter.

7. The hydrodynamic coupling arrangement according to claim 1, wherein the at least one deflection mass is rotatably coupled to the deflection mass carrier at a coupling area.

8. The hydrodynamic coupling arrangement according to claim 7, wherein the at least one deflection mass is rotatable by 360° with respect to the deflection mass carrier.

* * * * *